United States Patent [19]

Nishikawa et al.

[11] Patent Number: 4,906,556
[45] Date of Patent: Mar. 6, 1990

[54] OPTICAL RECORDING MEDIUM

[75] Inventors: Yasuo Nishikawa, Kanagawa; Yonosuke Takahashi, Shizuoka, both of Japan

[73] Assignee: Fuji Photo Film Co., Ltd., Kanagawa, Japan

[21] Appl. No.: 376,944

[22] Filed: Jul. 10, 1989

Related U.S. Application Data

[63] Continuation of Ser. No. 947,313, Dec. 29, 1986, abandoned.

[30] Foreign Application Priority Data

Dec. 26, 1985 [JP] Japan .................. 60-294552

[51] Int. Cl.⁴ ................................ G03C 1/72
[52] U.S. Cl. ..................... 430/531; 430/271; 430/273; 430/346; 430/523; 430/945; 430/961; 346/135.1
[58] Field of Search .............. 430/270, 271, 273, 523, 430/531, 532, 346, 961, 945, 495; 346/135.1

[56] References Cited

U.S. PATENT DOCUMENTS 4,711,809 12/1987 Nishikawa et al. ............ 428/336

Primary Examiner—Paul R. Michl
Assistant Examiner—Lee C. Wright
Attorney, Agent, or Firm—Sughrue, Mion, Zinn, Macpeak & Seas

[57] ABSTRACT

An optical recording medium comprising a substrate and a recording layer made of metal and/or semi-metal and on which data can be recorded with a laser beam, wherein a plasma polymerization layer is formed on at least an upper surface of said recording layer.

4 Claims, 1 Drawing Sheet

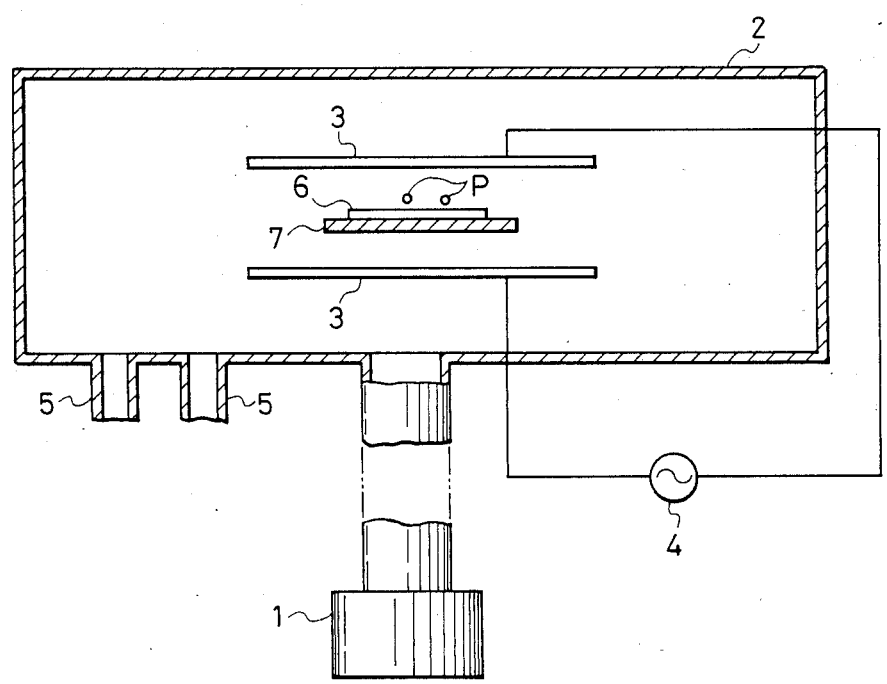
FIGURE

OPTICAL RECORDING MEDIUM

This is a continuation of application Ser. No. 947,313 filed on Dec. 29, 1986 now abandoned.

FIELD OF THE INVENTION

This invention relates to an optical recording medium for an optical recording apparatus which optically records and reproduces data, and more particularly to an optical recording medium excellent in preservation and in stability, especially under the conditions of high temperature and high humidity.

BACKGROUND OF THE INVENTION

Recently, much interest has been directed to an optical recording system which uses a method of optically recording data on a film with an He-Ne laser, Ar laser or semiconductor laser, and then reproducing the data from the film. This system permits high speed access to data.

In the optical recording system, data are recorded as follows: a laser beam is focused on a film-like recording medium to locally increase the temperature in order to change optical characteristics (such as reflection factor, transmittance and refractive index) of the recording layer, or to melt, deform, evaporate or remove the recording layer, thereby permitting data to be written on the recording medium.

The optical recording medium comprises a substrate and a recording layer. The substrate is in general, made of glass, polycarbonate, epoxy resin, polymethylmethacrylate, polyacrylonitrile, or polypentene. The recording layer is a thin film formed by vacuum deposition or sputtering, which contains one or more of the following elements: Te, Sn, In, Au, Ag, Pt, Se, As, Bi, Al, Ga, Ge, Mo, Pb, Cu, Sn, Zn, Ni, Ti, Sb and B.

If the recording layer is completely exposed, then it is oxidized by oxygen in the air, or deteriorated by contact with dust or the human body. Even if the recording layer is not exposed, it may be deteriorated by water molecules from the substrate surface or a small quantity of gas which is formed inside the substrate and comes out through the surface. A two-sided recording medium is relatively free from the above-described difficulties. However, since it is formed by bonding two symmetrical recording media together with adhesive (thermosetting resin or radiation-setting resin), it is also deteriorated by monomers or reactive low molecular weight compounds which are produced by the adhesive. This is a serious problem for the two-sided recording medium. In order to overcome these difficulties, a method has been proposed in the art in which the upper surface and/or the lower surface of the recording layer is covered with a protective film such as an ultraviolet-setting protective layer (Japanese Patent Application (OPI) No. 169238/1981 (the term "OPI" as used herein means "an unexamined published application").

However, the conventional method is still disadvantageous in that the protective film is an insufficient barrier against water, low molecular weight compounds and ions. Thus, deterioration with time of the recording layer when held at high temperature and high humidity cannot be completely eliminated.

SUMMARY OF THE INVENTION

The present inventors have conducted intensive research on the above-described problems accompanying a conventional optical recording medium, and as a result accomplished this invention.

One object of this invention is to provide an optical recording medium wherein little or no deterioration occurs when held at high temperature and high humidity.

The foregoing object of the invention has been achieved by the provision of an optical recording medium comprising a substrate and a recording layer made of metal and/or semi-metal and on which data can be recorded with a laser beam, wherein a plasma polymerization layer is formed on at least an upper surface of said recording layer.

BRIEF DESCRIPTION OF THE DRAWING

The FIGURE is an explanatory diagram showing one example of an apparatus which is suitable for forming a plasma polymerization film according to this invention.

DETAILED DESCRIPTION OF THE INVENTION

The transparent substrate employed in the invention can be made, for example, of glass, polycarbonate, polyacrylonitrile, polymethylmethacrylate, epoxy resin or polypentene.

The recording layer is a thin film made of one or more of the following elements: Te, Sn, In, Au, Ag, Pt, Se, As, Bi, Al, Ga, Ge, Mo, B, Sb, Pb, Cu, Zn, Ni and Ti. These metals may be laminated or mixed with semi-metals including metal sulfides such as GeS, $GeS_2$, SnS, $In_2S_3$, $Al_2S_3$ and $Ga_2S_3$, metal oxides such as MoO, $MoO_2$, WO, $WO_3$, InO, $In_2O_3$, GeO, $GeO_2$, SiO, $SiO_2$, $Al_2O_3$ and $SnO_2$, or fluorides, silicides or nitrides of other metals.

The recording layer can also be made only of semi-metals such as those described above.

In the invention, a variety of physical or chemical phenomena can be used to elicite the optical nature of the recording layer. A laser beam can be focused on the recording film to raise the temperature so that the crystalline state of the film is changed to the non-crystalline state or vice versa. That is, a phase change can be reversibly induced with a laser beam. Furthermore, the reversible phase change can be used to repeatedly carry out data recording, reproducing and erasing operations. Examples of the recording layer in which the crystalline state and the non-crystalline state can be changed back and forth to each other as described above are those which are made of one or more of the following elements: Te, Se, As, Ge, Ga, In, B, Sb, S, Pb and Sn.

In the invention, the recording layer disclosed by Japanese Patent Application Publication No. 41902/1979 can be effectively employed.

Furthermore, in the invention, a recording layer whose crystalline state is changed to another crystalline state by focusing a laser beam on the layer can be used. The change between the different crystalline states may be reversible. Preferable examples of the recording layer as described above are alloys of Ag-Zn, SeInSb and InSb.

In addition, an alloy film causing a martensite transition, and which is disclosed in Japanese Patent Application (OPI) No. 32130/1985 can be used.

In the invention, the recording layer can be formed by conventional methods such as by a resistance-heating vacuum deposition method, electron beam vacuum deposition method, sputtering method or plating method.

The transparent substrate suitably has a thickness ranging from about 0.5 mm to about 3 mm. The recording layer suitably has a thickness ranging from about 0.01 μm to about 0.5 μm.

The specific feature of one embodiment of the invention resides in that a plasma polymerization film is formed at least on the upper surface of the recording layer which is formed on the substrate. However, in order to achieve the object of the invention, the plasma polymerization film may be provided not only on the upper surface of the recording layer but also between the recording layer and the surface of the substrate.

The thickness of the plasma polymerization layer is preferably about 50 Å to about 0.2 μm, more preferably about 100 Å to about 500 Å. If the thickness is smaller than about 50 Å, the barrier characteristic against the permeation of low molecular weight compounds is insufficient. Further it is not practical that the plasma polymerization layer has a thickness greater than about 0.2 μm, because it takes a relatively long time to form such a heavy film.

In the invention, the plasma polymerization film can be formed by any compound (hereinafter referred to as "a monomer") that has a vapor pressure of about $10^{-4}$ Torr at 20° C. That is, any compound that can vaporize at a pressure of about $10^{-4}$ Torr at 20° C. can be used to form the plasma polymerization film. Preferably the monomer should have a boiling point of about 200° C. or less.

Preferred examples of the monomer are aliphatic saturated hydrocarbons such as methane, ethane, propane, butane, pentane, hexane, octane and heptane; aliphatic unsaturated hydrocarbons such as ethylene, propylene, butene, hexene, butadiene, hexatoluene and acetylene; aromatic compounds such as benzene, toluene, m-xylene, o-xylene, p-xylene, ethylbenzene, styrene and naphthalene; saturated cyclic hydrocarbons such as cyclopropane, cyclobutane, cyclopentane, cyclohexane, cycloheptane, cyclooctane, cyclononane and cyclodecane; and partially saturated cyclic hydrocarbons such as cyclobutene, cyclopentene, cyclohexene and cycloheptene. In addition, hydrocarbon fluorides or chlorides such as tetrafluoromethane, difluoroethane, chlorotrifluoroethane, tetrafluoroethylene, difluoroethylene, hexafluorobutadiene, methoxylenehexafluoride and octafluorocyclobutane may be employed. If, in the case of saturated halocarbons, the number of hydrogen atoms in the molecule is smaller than the number of halogen atoms, the polymerization scarcely takes place. However, the polymerization can be obtained by mixing it with a monomer gas containing more hydrogen atoms. Furthermore, alcohols, ketones, ethers, and fatty acids can also be used. As for the monomer gas, those which are described above can be used alone or in combination.

In addition, silane compounds can also be employed.

Of these, more preferable monomers are aliphatic unsaturated hydrocarbons such as ethylene, propylene, butene, hexene butadiene, hexatoluene and acetylene; aromatic compounds such as benzene, toluene, m-xylene, o-xylene, p-xylene, ethylbenzene, styrene, and naphthalene; saturated cyclic hydrocarbons such as cyclopropane, cyclobutane, cyclopentane, cyclohexane, cycloheptane, cyclononane and cyclodecane; partially saturated cyclic hydrocarbons such as cyclobutene, cyclopentene, cyclohexene and cycloheptene; and silane compounds having an unsaturated alkyl group such as dimethylvinylsilane and diaryldimethylsilane.

In addition, even more preferable monomers are aliphatic unsaturated hydrocarbons such as ethylene, propylene, butene, hexene, butadiene, hexatoluene and acetylene which have the following general formula:

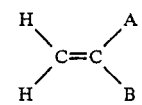

where A is H or F, and B is H, Cl, or an alkyl or alkenyl group in which the number of carbons is one or more.

The plasma polymerization film used in the invention is formed as follows: The monomer gas is used to produce a plasma according to a method described below. The plasma thus produced is applied to the surface of the recording layer (or the surface of the substrate in the case where a plasma polymerization film is provided between the substrate and the recording layer) to form a plasma polymerization film. An inert gas such as argon, neon, krypton or xenon may be added to the monomer gas.

In the invention, an electrodeless discharge type plasma polymerization apparatus or an electrode discharge type plasma polymerization apparatus may be employed. Furthermore, an internal electrode type plasma polymerization apparatus having its electrodes inside the polymerization tank, or an external electrode type plasma polymerization apparatus having its electrodes outside the polymerization tank may be employed. In addition, a method in which a monomer gas is introduced into the after-glow may be employed. It is preferable to employ the internal electrode type plasma polymerization apparatus, as described in the FIGURE, which provides stable plasma and the method of introducing the monomer gas into the after-glow.

The plasma oscillating frequency may be of a low frequency wave, high frequency wave, or a microwave; that is, it is not particularly limited.

The electron temperature (Te) is in a range of from about 5000K to about 70,000K, preferably from about 5000K to about 40,000K, and more preferably from about 5000K to about 30,000K. The electron temperature (Te) can be measured according to a double-probe method, disclosed in Japanese Patent Application (OPI) No. 135574/1979, in which heated probes are used. If Te is larger than about 70,000K, it is difficult to form a uniform plasma polymerization film having no pin holes. If Te is smaller than about 5000K, it is not practical because the polymerization speed is low. In the case where Te is in a range of from about 5000K to about 40,000K, the plasma polymerization film adheres satisfactorily to the recording layer, thus providing an excellent coating over the latter.

The gas flow rate is preferably from about 0.1 ml to about 500 ml/minute for a 100 l reaction tank.

The pressure of the plasma polymerization system is preferably about $10^{-3}$ Torr to about 1 Torr, more preferably about $10^{-3}$ Torr to about $10^{-1}$ Torr. If the pressure is higher than the above-described value, then the formed plasma polymerization film is like powder, thus greatly smudging the inside of the plasma reaction tank. If the pressure is lower, then it takes a long period of time to form the polymerization layer.

The FIGURE shows an apparatus suitable for forming a plasma polymerization film according to this invention. In the apparatus, a pair of plate-shaped electrodes 3 and 3 are disposed in a vacuum container 2 in such a manner that the electrodes are confronted with each other. The vacuum container 2 is connected to a vacuum pump 1. An AC source 4 is connected to the electrodes 3. A single or plurality of monomer gas supplying pipes 5 are connected to the vacuum container 2. An article 6 which is, for instance, a substrate or a substrate on which an optical recording layer is formed is placed on a stand 7 positioned between the electrodes 3 and 3. A thermal probe P is positioned between electrodes 3 and 3 and above the article 6 for monitoring the electron temperature of the plasma to be formed. With the apparatus, a recording medium is manufactured by forming a protective film as follows:

While the vacuum container 2 is evacuated with the vacuum pump 1, the above-described monomer gas (including an inert gas as the case may be) is supplied through the monomer supplying pipe(s) 5 into the vacuum container 2.

With the pressure in the vacuum container 2 maintained constant, electric power is supplied to the electrodes 3 and 3 from the AC source 4 so that an electric discharge occurs between the electrodes 3 and 3 thereby forming plasma. The electron temperature of the plasma thus formed is set at about 5,000K to about 70,000K at the position where the article on which a film is to be formed is located. Under this condition, the plasma is caused to act on the article (such as a substrate or a substrate on which an optical recording layer is formed) on which a plasma polymerization film is to be formed, so that a protective film is formed on the surface of the article by the monomer gas.

According to the present invention a preferred embodiment comprises a double-sided optical recording medium which is formed by bonding two optical recording media of the invention through an adhesive layer. In this embodiment, the plasma polymerization films provided on the upper surfaces of the two recording layers face each other and the adhesive layer is provided between the two plasma polymerization films.

Examples of the adhesive used in the invention are an urethane adhesive (which is made of an isocyanate containing compound or which is a mixture of an isocyanate containing compound and a material having a functional group such as a hydroxyl group, amino group or carboxyl group which reacts readily with isocyanate, the adhesive providing a strong bonding effect through thermo-setting), an epoxy adhesive (with an epoxy compound reacting with a setting agent such as an amine setting agent), a setting silicone resin, hot-melt adhesive (such as an ethylene-vinyl-acetate resin), and a high frequency adhesive (such as a polyvinyl chloride resin). Use of a solvent type adhesive (which is obtained, for instance, by dissolving synthetic rubber or a vinyl resin polymer in organic solvent) is not practical, because it is often low both in preservation and in stability when used. Use of a UV setting adhesive is also not preferable.

The invention will now be described with reference to specific examples. However, the invention is not to be construed as being limited thereto.

EXAMPLES

In the Examples, it was assumed that, according to the film forming speed obtained from a model experiment, the thickness of the plasma polymerization film thus formed could be obtained from the relation: (thickness)=(film forming speed)×(polymerization time). Accordingly, in order to obtain a plasma polymerization film having a desired thickness, the polymerization time was obtained by dividing the desired thickness by the known film forming speed.

Thus, the term "model experiment" as used herein is intended to mean the experiment which, according to various polymerization conditions, obtains polymerization times and proportional constants of formed film thicknesses.

In the present case, the film forming speed was measured by forming a plasma polymerization film of aluminum having a thickness of 5000 Å by vacuum-deposition on a glass substrate. Although an aluminum film was employed in order to measure the film forming speed, approximately the same results were obtained by employing other film forming materials.

An optical recording layer of Te 85% and Ge 15% in atomic percentage was formed on a polycarbonate disc-shaped transparent substrate by magnetron sputtering, and various protective layers were formed on the surface to provide samples No. 1 through No. 8 listed in the following Table 1. Furthermore, the same samples were bonded together with adhesive to provide two-sided type optical recording media, designated samples No. 9 through No. 16 listed in the following Table 2.

TABLE 1

| PROTECTIVE FILM ON THE RECORDING LAYER | | | |
|---|---|---|---|
| No. | | | |
| 1 | Comparison example | $S_iO_2$ | 1000 A |
| 2 | Comparison example | $S_iO_{1.4}$ | 1000 A |
| 3 | Comparison example | ZnO | 1000 A |
| 4 | Concrete example | Plasma Polymerization film A | 500 A |
| 5 | Concrete example | Plasma Polymerization film B | 1000 A |
| 6 | Concrete example | Plasma Polymerization film C | 1000 A |
| 7 | Concrete example | Plasma Polymerization film A | 1000 A |
| 8 | Concrete example | Plasma Polymerization film A | 1000 A |

TABLE 2

| No. | | CONTENT | ADHESIVE |
|---|---|---|---|
| 9 | Comparison example | Two samples of No. 1 are bonded together | a |
| 10 | Comparison example | Two samples of No. 2 are bonded together | c |
| 11 | Comparison example | Two samples of No. 3 are bonded together | d |
| 12 | Comparison example | Two samples of No. 4 are bonded together | a |
| 13 | Comparison example | Two samples of No. 5 are bonded together | b |
| 14 | Comparison example | Two samples of No. 6 are bonded together | a |
| 15 | Comparison example | Two samples of No. 7 are bonded together | c |
| 16 | Comparison example | Two samples of No. 8 are bonded together | d |

With the RF magnetron sputtering apparatus, $SiO_2$, $SiO_{1.4}$ and ZnS films were formed as protective films on a recording layer under the following conditions;

The targets used were $SiO_2$, SiO and ZnS. The degree of vacuum was initially set to about $10^{-6}$ Torr, and then adjusted to $1 \times 10^{-3}$ Torr by introducing Ar gas or the like.

The sputtering operation was carried out for ten minutes with a RF 500W. As a result, a film thickness of 1000 Å was obtained.

Plasma polymerization films A through E were formed by using the apparatus of the FIGURE under the conditions indicated in the following table:

|  | Monomer Gas | Pressure mTorr | Discharge current (mA) | Gas Flow rate (cc/min) |
|---|---|---|---|---|
| Plasma polymerization film A | Batadiene | 50 | 75 | 20 |
| Plasma polymerization film B | Ethylene | 50 | 60 | 25 |
| Plasma polymerization film C | $CH_4 + CF_4$ (equal mol) | 50 | 150 | 20 |
| Plasma polymerization film D | Cyclohexane | 50 | 100 | 20 |
| Plasma polymerization film E | $CH_4 + CF_4$ (equal mol) | 50 | 180 | 20 |

In the case of a two-sided optical medium, $SiO_2$, $SiO_{1.4}$ and ZnS protective films were formed under the following conditions: $SiO_2$, SiO and ZnS were employed as targets. The degree of vacuum was initially set to about $10^{-6}$ Torr, and then adjusted to $1 \times 10^{-3}$ Torr by introducing Ar gas. The sputtering operation was carried out for ten minutes with RF 500W. The film thickness was 1000 Å.

Four kinds of adhesive having the following compositions were used to form the double-sided optical recording media:

a. Urethane oligomer + 3 functional isocyanate setting agent.

b. Urethane oligomer + 2 functional isocyanate setting agent.

c. Epoxy oligomer + triethylene diamine setting agent.

d. RTV-45 (hardening silicone resin) manufactured by Shinetsu Kagaku Co.

The characteristics of the samples were evaluated by subjecting them to reflection factor measurement and to external appearance observation before and after they were held at 60° C. and 90% RH for ten days.

The reflection factor measurement was carried out using a wavelength of 8300 Å according to the conventional reflection method. The external appearance observation was made under an optical microscope set to a magnification of 100×, according to the transmission observation method, so as to evaluate the degree of deterioration from the degree of formation of pin holes attributed to the recording layer corrosion.

The results are shown in Tables 3 and 4.

TABLE 4

| | BEFORE HELD | | AFTER HELD AT HIGH TEMPERATURE AND HIGH HUMIDITY | |
|---|---|---|---|---|
| No. | REFLECTION FACTOR (%) | EXTERNAL APPEARANCE (note) | REFLECTION FACTOR (%) | EXTERNAL APPEARANCE (note) |
| 9 | 55 | O | 34 | X |
| 10 | 55 | O | 36 | X |
| 11 | 55 | O | 29 | X |
| 12 | 55 | O | 49 | O |
| 13 | 55 | O | 50 | O |
| 14 | 55 | O | 51 | O |
| 15 | 54 | O | 50 | O |
| 16 | 53 | O | 48 | O |

Note:
EXTERNAL APPEARANCE
O: Satisfactory (no pin holes are formed)
X: Considerably deteriorated (pin holes are formed by corrosion)

TABLE 3

| | BEFORE HELD | | AFTER HELD AT HIGH TEMPERATURE AND HIGH HUMIDITY | |
|---|---|---|---|---|
| No. | REFLECTION FACTOR (%) | EXTERNAL APPEARANCE (note) | REFLECTION FACTOR (%) | EXTERNAL APPEARANCE (note) |
| 1 | 55 | O | 32 | X |
| 2 | 55 | O | 34 | X |
| 3 | 55 | O | 28 | X |
| 4 | 55 | O | 47 | O |
| 5 | 55 | O | 48 | O |
| 6 | 55 | O | 48 | O |
| 7 | 54 | O | 47 | O |
| 8 | 53 | O | 48 | O | note:
EXTERNAL APPEARANCE
O: Satisfactory (no pin holes are formed)
X: considerably deteriorated (pin holes are formed) by corrosion As can be seen from the results, comparative examples 1, 2, 3, 9, 10 and 11 all showed a great decrease in the reflection factor and a considerably deteriorated external appearance due to corrosion after being held at high temperature and high humidity, while such was not seen with the examples according to the present invention.

While the invention has been described in detail and with reference to specific embodiments thereof, it will be apparent to one skilled in the art that various changes and modifications can be made therein without departing from the spirit and scope thereof.

What is claimed is:

1. An optical recording medium comprising a substrate and a recording layer made of one or more metals and/or semi-metals selected from the group consisting of Te, Sn, In, Au, Pt, Se, As, Bi, Al, Ga, Ge, Mo, Sb, Pb, Ti, laminates of said metals with semi-metals, mixtures of said metals with semi-metals, sulfides of said metals, oxides of said metals, metal fluorides, metal silicides, and metal nitrides and on which data can be recorded with a laser beam, wherein a plasma polymerization layer is formed on at least an upper surface of said recording layer and is formed by a monomer having the following formula:

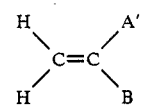

wherein A' is a hydrogen atom and B is any member selected from the group consisting of a hydrogen atom and one of an alkyl or an alkenyl group having one or more carbon atoms.

2. An optical recording medium as claimed in claim 1, further comprising a second optical recording medium identical to the optical recording medium of claim 1 and bonded to the optical recording medium of claim 1 by means of an adhesive layer provided between the plasma polymerization layers formed on the upper surfaces of the recording layers of the two recording media.

3. An optical recording medium as claimed in claim 1, wherein the thickness of the plasma polymerization layer is about 50 Å to about 0.2 μm.

4. An optical recording medium as claimed in claim 1, wherein the plasma polymerization layer is formed from a compound that has a vapor pressure of or about $10^{-4}$ Torr at 20° C.

* * * * *